Sept. 9, 1941.  J. L. O'REILLY  2,255,676
METHOD AND APPARATUS FOR REMOVING AIR FROM HYDRAULIC BRAKES
Filed Sept. 30, 1939
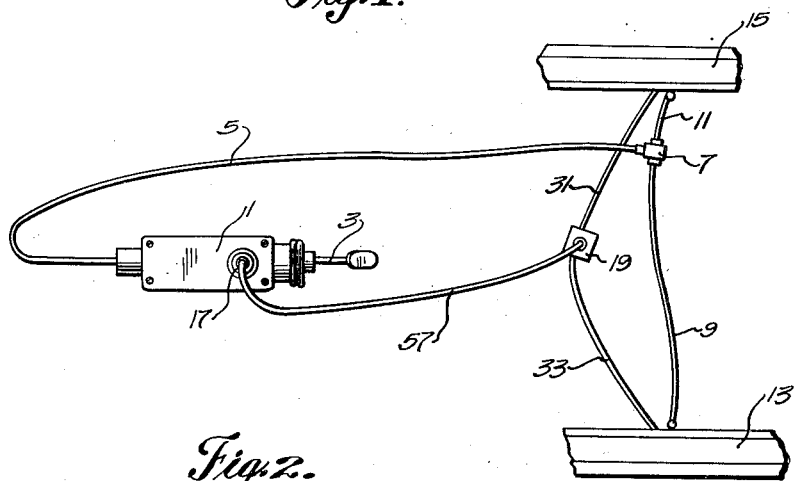
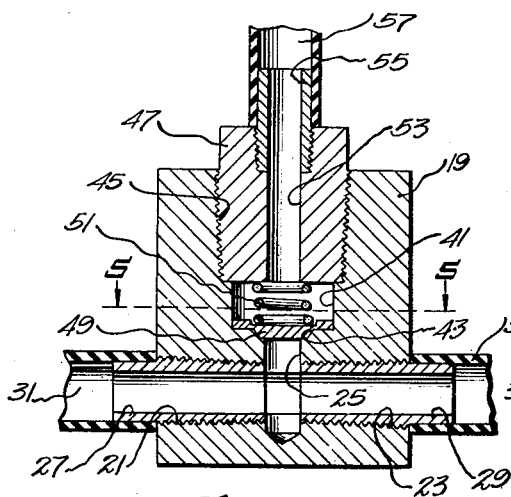
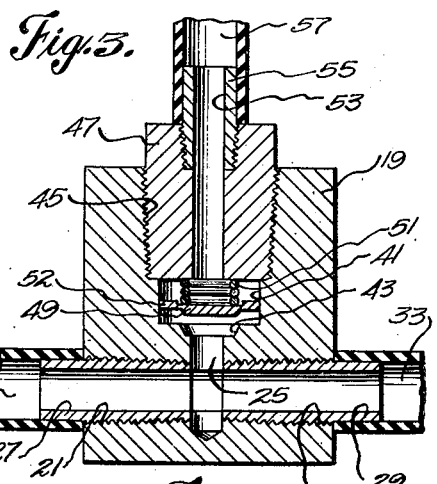
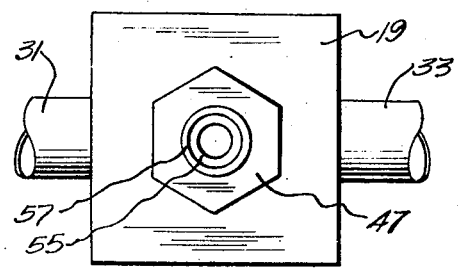
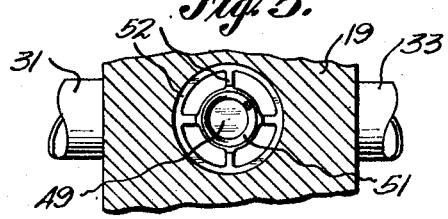
INVENTOR.
JOHN L. O'REILLY.
BY
ATTORNEY.

Patented Sept. 9, 1941

2,255,676

UNITED STATES PATENT OFFICE 2,255,676

METHOD AND APPARATUS FOR REMOVING AIR FROM HYDRAULIC BRAKES

John L. O'Reilly, Pontiac, Mich.

Application September 30, 1939, Serial No. 297,213

1 Claim. (Cl. 188—152)

This invention relates to a method and an apparatus for carrying out the method, for removing air from hydraulic brakes, more particularly in automobiles.

As is well known, a hydraulic brake system comprises a master or pressure cylinder in association with and obtaining fluid from a fluid container, the latter having a plugged opening for filling the same and being provided with a suitable vent, said cylinder discharging into a suitable fluid conveying conduit or conduits connecting to a brake cylinder at each wheel for operating the brakes. As is also well known, air, being compressible, destroys the efficiency of hydraulic brakes, and as air bubbles have been found to develop in hydraulic brake systems due to evaporation of brake fluid or otherwise, some means must be provided for releasing the air from the system.

Most hydraulic brake systems now in use in automobiles are provided with bleeding valves at each brake cylinder for the purpose of draining the hydraulic fluid and consequently exhausting the air from the system. The hydraulic fluid is pumped through the system and collected from each brake cylinder in a suitable container. Then it is returned to the master cylinder, the air rising from the fluid as the latter is passed into the container. This action is repeated until no air remains in the system, at which time the bleeding valves are closed. This method takes considerable time and is wasteful and dirty, often soiling one's hands and clothes as well as the garage floor.

I am aware that a brake system having means for automatically removing air from its brakes has been designed, but such method and apparatus is not adapted to be used on other hydraulic brake systems as it is an inherent part of the system itself.

It is therefore the main object of my invention to provide a method of and an attachable and detachable apparatus for bleeding hydraulic brake systems of automobiles and similar vehicles which will save time, will prevent waste of the hydraulic fluid and minimize the consequent soiling of one's hands and clothes and adjacent surroundings.

It is a further object of my invention to provide such an apparatus which is of simple construction, economical to manufacture.

These and other objects will be apparent from the following description the embodiment shown in the accompanying drawing, in which:

Fig. 1 is a schematic plan view of a hydraulic brake system for controlling the brakes of two wheels, the latter being shown partially diagrammatically, and showing an embodiment of my invention connected thereto;

Fig. 2 is a sectional detail showing a portion of my apparatus, namely a suitable check-valve in closed position;

Fig. 3 is a sectional detail showing said check-valve in open position;

Fig. 4 is a top plan view of my said check-valve; and

Fig. 5 is a plan view showing a valve guide.

The hydraulic system illustrated in Fig. 1 will first be described. There is a casing 1, in which is located the usual master cylinder with a fluid container above it. The usual operating shaft or piston rod 3 is shown adapted for connection to a foot pedal for operating the usual piston (not shown) of said master cylinder. The discharge end of the master cylinder is connected by a hose, pipe, or conduit 5 to a suitable T-joint 7 which has two branch pipes 9 and 11 leading to and hydraulically connected to the brake cylinders of wheels 13 and 15, which being arranged in any usual and well known manner are not shown in detail.

The casing is apertured at the top as shown at 17 for the purpose of filling the fluid container and a suitable vented plug is usually inserted in said opening, the vent being angled in such manner as to keep dirt out and to permit air to pass through in any well known arrangement.

The above apparatus forms no part of my invention, but is only shown to illustrate one form of hydraulic brake system to which my apparatus may be applied for bleeding air from it.

In accordance with my invention, I provide a check valve body or member 19 having two inlet apertures 21 and 23, leading to a common or central passage 25 which opens into a valve chamber 41. The apertures 21 and 23 are shown connected by internal screw threads to externally threaded connecting pipes or nipples 27 and 29. The nipples 27 and 29 of the valve are connected with branch hoses or pipes 31 and 33, the ends of which are adapted to be fitted over the relief or bleeder valves of the respective brake cylinders.

In the valve body member 19 the valve chamber 41 may be conveniently formed as an enlarged counterbore substantially concentric to the smaller central passage 25 which connects therefrom. The junction between the valve chamber 41 and the upper end of the central passage 25 is provided with an enlarged counterbore greater in diameter than the passage 25 and smaller than the chamber 41 and having a tapered side wall forming a valve seat 43. The outer end of the chamber 41 is provided with an enlarged counter-bore 45 which is threaded to receive a threaded plug 47 therein. A suitable valve 49 is provided for seating snugly into the valve seat 43 where it is pressed by a spring 51 reacting between the inner end of the plug and the valve. A suitable valve guide 52 is provided to insure correct seating of the valve. Fluid received in valve chamber 41 is conducted away through a passage 53 opening through the plug 47. The outer end of passage 53 is provided with an enlarged threaded counter-bore for receiving the threaded end of a nipple 55. The outer end of nipple 55 is of suitable conformation for snugly receiving the end of a return pipe or hose 57 which I provide for bleeding the system and which extends from the discharge or outlet side of my check valve for discharging the returned fluid into the liquid reservoir in the casing 1 above the master cylinder, when the plug of the latter is removed.

When it is desired to remove air and gases from a hydraulic brake system, the operator connects my apparatus to the relief valves of the system, opens said valves and removes the casing plug from the casing and fluid container and puts the end of my hose 57 through the aperture 17. He now pushes push rod 3 in the same manner as for operating the brakes and the spring 51 yields, permitting the valve 49 to lift and a portion of the high pressure liquid is discharged through the valve 49 and returns through the line 57 to the fluid reservoir above the master cylinder. When pressure is released from the push rod 3, the compressible member or piston of the master cylinder (not shown) returns to its neutral or normal position and a fresh charge of liquid flows down therein from the liquid reservoir in a well known manner to take the place of the displaced fluid. To remove the air and gases from the system, this operation is repeated a number of times and the circulation of the fluid through the system quickly carries any gases or air around to the reservoir where it escapes from the vent or aperture 7.

In this manner the gases and air may be quickly and conveniently removed from a hydraulic brake system. After the system has been sufficiently cleaned of air and gases in the manner described, my apparatus, comprising valve 19 and its associated pipes 31, 33 and 57 is removed and the vented plug of casing 1 is replaced and the bleeder valves of the brake cylinders are closed and the brake system is prepared in good condition for normal use and operation.

I claim:

An apparatus for temporarily connecting with automotive hydraulic systems for bleeding air and gases therefrom comprising, return conduit means for temporarily connecting to the relief valves of each brake operator and returning through the filling aperture of the fluid chamber of the master cylinder, a valve body connected into said return conduit means, a valve chamber in said valve body, a central passage extending in said body and connecting from said valve chamber, a plurality of fluid receiving ports connecting from said central passage and opening from said body, a valve associated with said central passage for resisting fluid flow from the central passage to said fluid receiving ports, and a fluid discharging port connecting from said valve chamber and opening from said body.

JOHN L. O'REILLY.